H. A. NOE.
Cream and Milk Trap for Churns.
No. 217,742. Patented July 22, 1879.
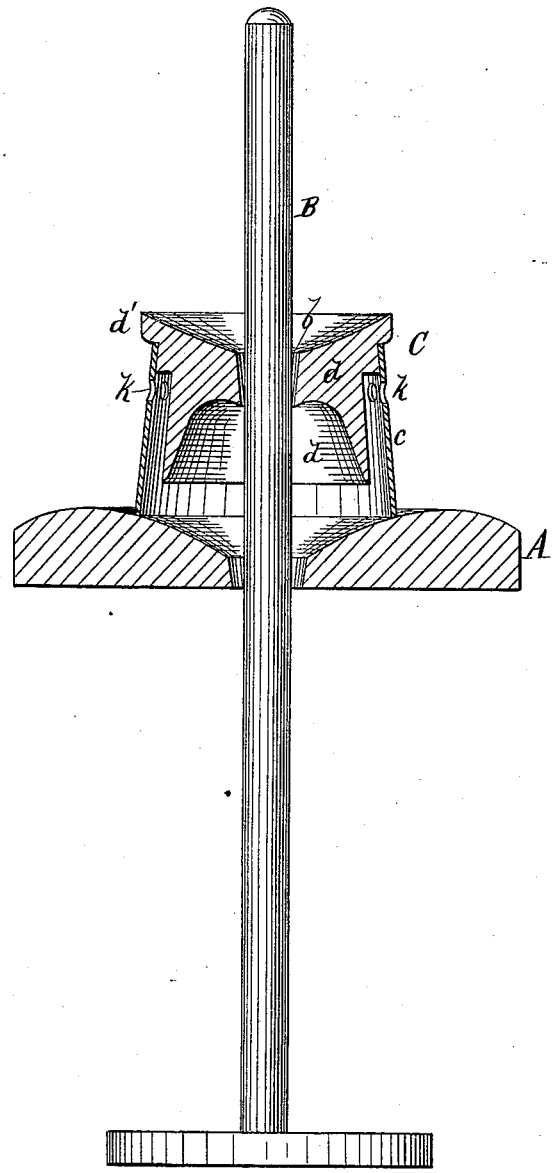
WITNESSES:
Henry N. Miller
C. Sedgwick
INVENTOR:
H. A. Noe
BY Munn & Co
ATTORNEYS.

UNITED STATES PATENT OFFICE.

HOMER A. NOE, OF REPUBLIC, MISSOURI.

IMPROVEMENT IN CREAM AND MILK TRAPS FOR CHURNS.

Specification forming part of Letters Patent No. 217,742, dated July 22, 1879; application filed March 6, 1879.

*To all whom it may concern:*

Be it known that I, HOMER A. NOE, of Republic, in the county of Greene and State of Missouri, have invented a new and Improved Cream and Milk Trap for Churns, of which the following is a specification.

The object of my invention is to furnish a device adapted for attachment to a churn for the purpose of catching the cream that escapes through the dash-opening and returning it to the churn, thereby preventing spattering and waste.

My invention consists in a trapping device that is placed upon the dash and rests on the churn-cover, and by its peculiar construction arrests the drops of cream that spatter out and that which adheres to the dash, and at the same time permits free movement and circulation of air.

In the accompanying drawing I have shown by a vertical section my device applied in connection with a churn-cover and dash-staff.

A is the cover, and B the dash-staff, of an ordinary churn in which the dash is adapted for vertical reciprocation.

C is the cream-trap, resting on cover A, the dash B passing the central aperture, $b$, of C. The trap C is made of metal, wood, or other suitable material, and consists of an outer ring, $c$, that rests on cover A, and supports the inner cup-shaped piece, $d$, through which piece $d$ the dash passes, as described. The ring $c$ is preferably formed with tapering side, with the longer diameter at the bottom.

The piece $d$ resembles an inverted cup. It is suspended in $c$ by its flanged rim $d'$, that rests on the upper edge of $c$, and there is a space between the lower rim of $d$ and the top of cover A. The lower part of $d$ is formed smaller than the upper part, so that there is an annular space between $c$ and $d$. At the upper portion of this space the ring $c$ is perforated, as at $k$, to permit ingress and egress of air. The upper surface of $d$ is dished, and the opening $b$ is enlarged at the top, whereby cream carried up by the dash will not be scraped off and lodged on $d$.

It will be seen that there is a considerable space inclosed by ring $c$ and piece $d$, the bottom of which is formed by the usual dished surface of cover A.

The cream that adheres to dash B and is carried above the cover will run naturally back into the churn, or be mostly scraped off by the lower edge of the aperture $a$.

The cream that is spattered through the opening of the cover A will strike upon the depending edge of $d$ usually, or sometimes upon the inner side of $c$, and will then run back to the churn.

It will be seen that as the cream spatters in straight lines it cannot fly out by openings $k$, which are shielded by the rim of $d$; but the necessary movement of air caused by the dash is freely permitted.

The ring $c$ and piece $d$ may readily be separated for cleaning.

I do not limit myself to the particular shape, construction, and proportion of the parts as shown and described, as they may be varied without departing from my invention.

Having thus described my invention, I claim as new and desire to secure by Letters Patent—

1. The device or trap C, consisting of an outer perforated ring, $c$, and an inner cup-shaped piece, $d$, the ring being provided with a depending flange or rim adapted for resting on a churn-cover around the reciprocating dash, substantially as and for the purposes specified.

2. The combination, with a reciprocating churn-dash and the churn-cover, of the ring $c$, perforated at $k$, and the inverted cup $d$, having a central aperture, $b$, the ring and cup being placed together upon the cover and around the dash, substantially as and for the purpose set forth.

HOMER A. NOE.

Witnesses:
W. H. NOE,
E. L. McHARDY.